June 4, 1929.  R. J. BURROWS  1,715,639
SHOP TRACTOR
Filed May 7, 1923  6 Sheets-Sheet 1

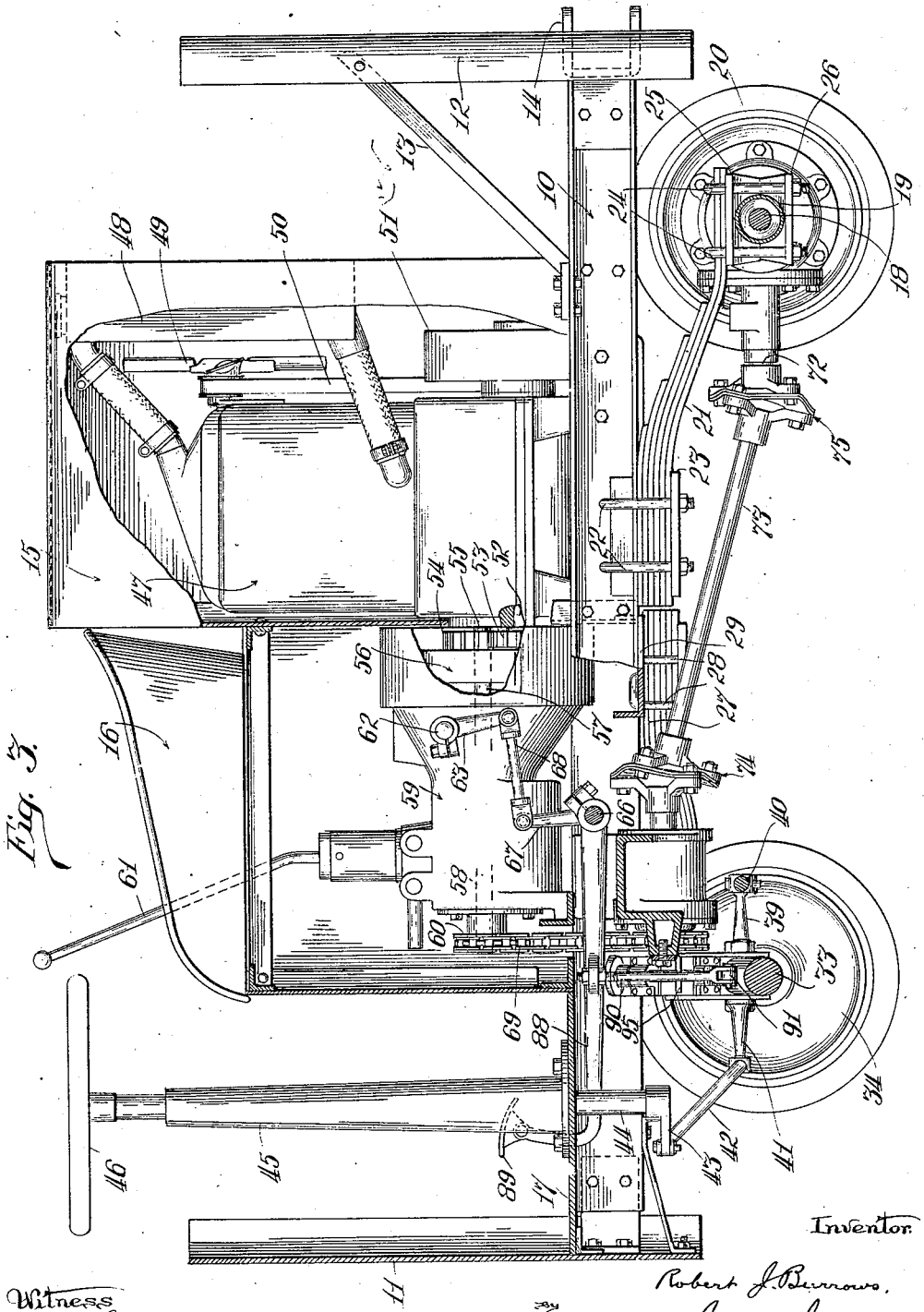

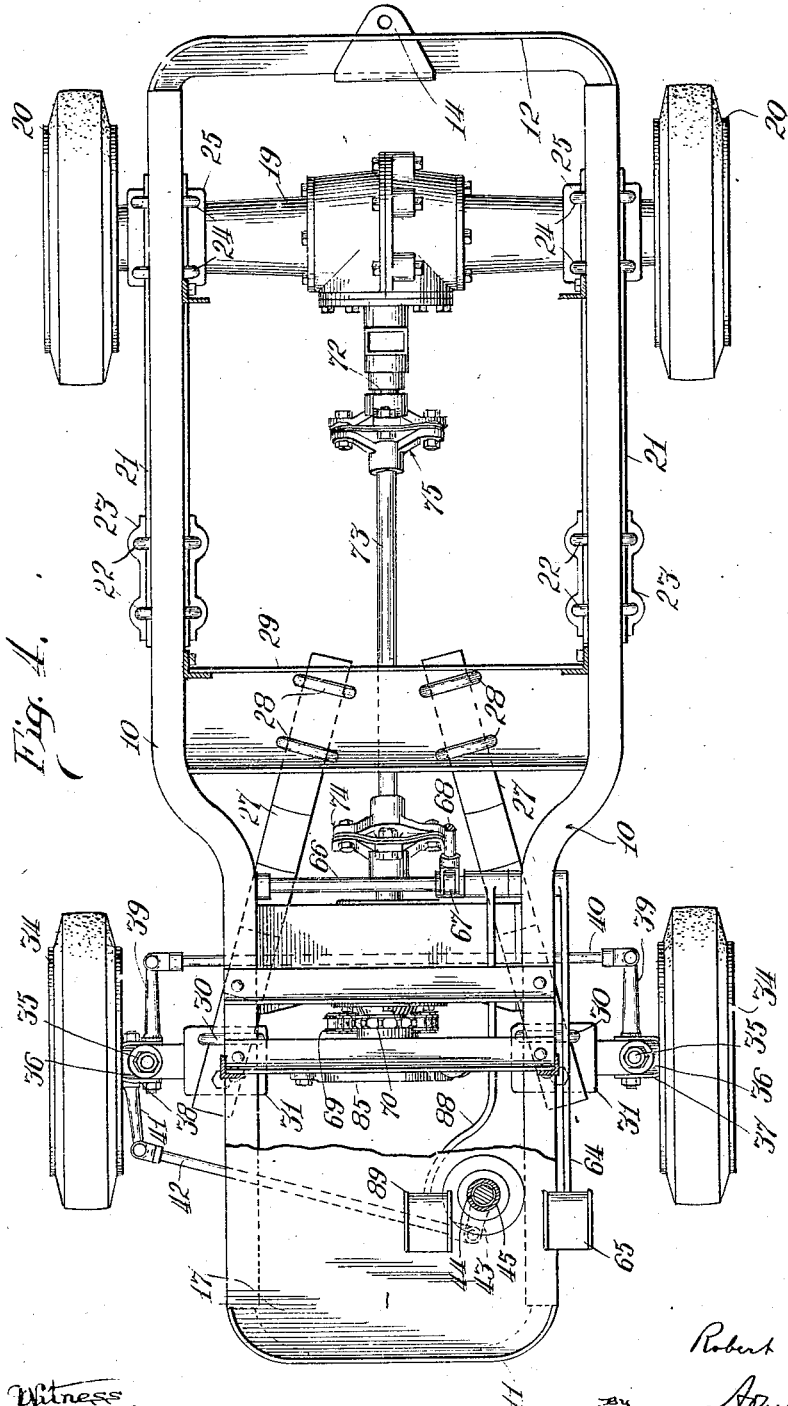

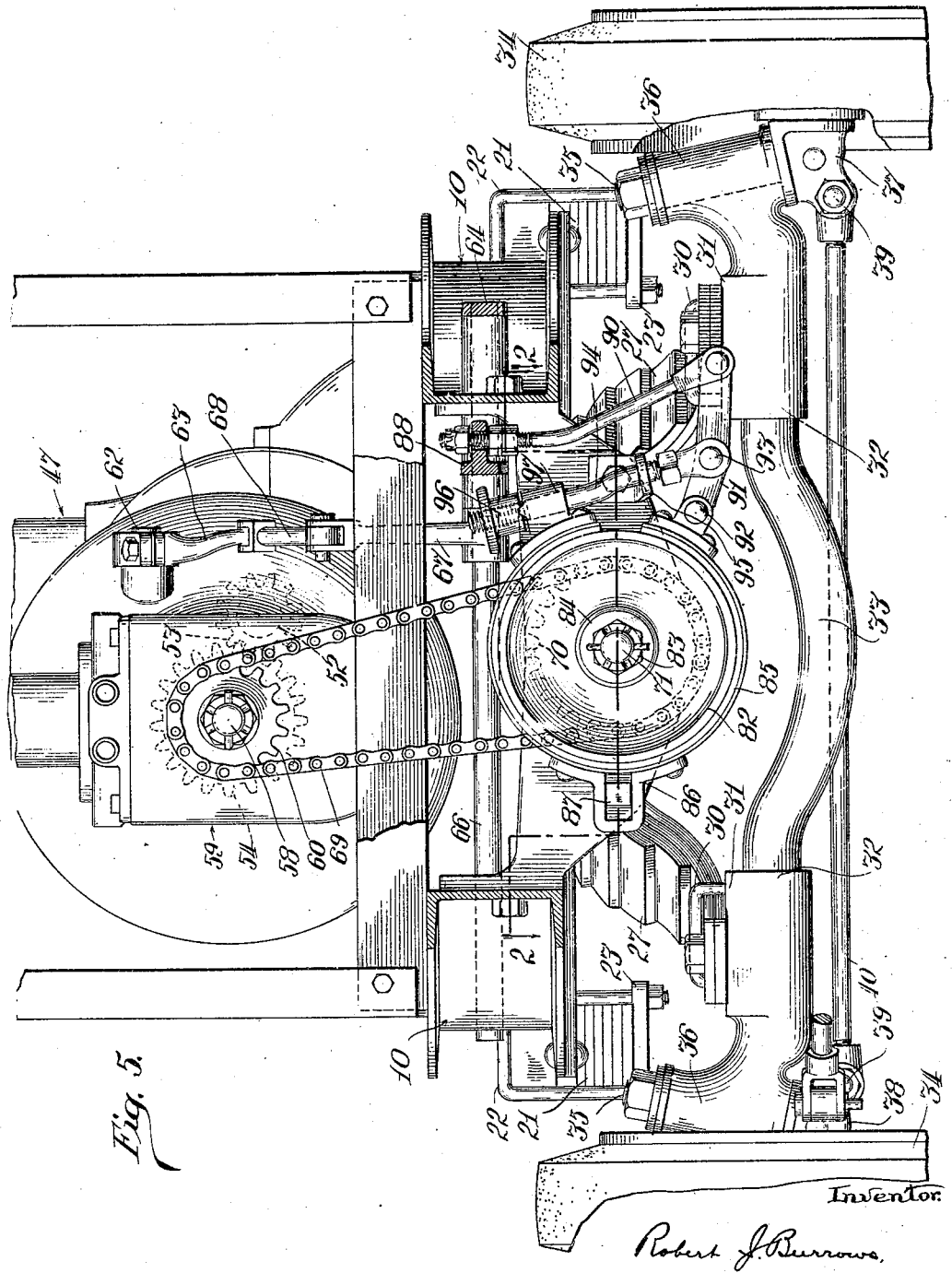

June 4, 1929.  R. J. BURROWS  1,715,639
SHOP TRACTOR
Filed May 7, 1923   6 Sheets-Sheet 5
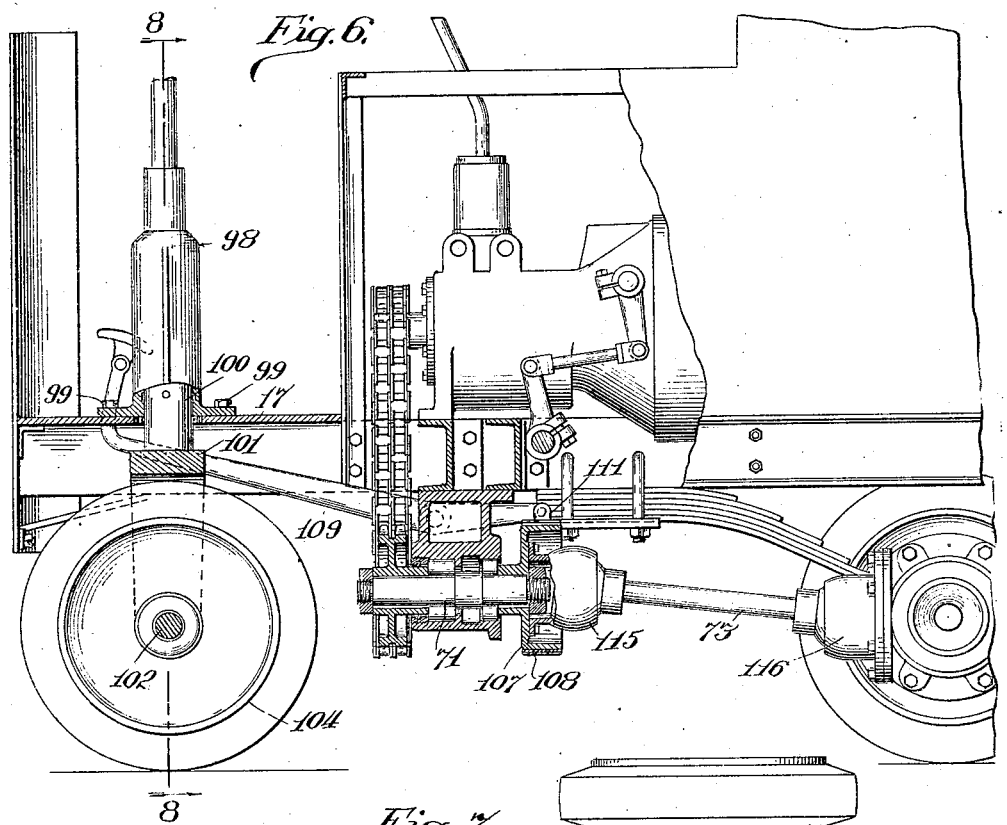
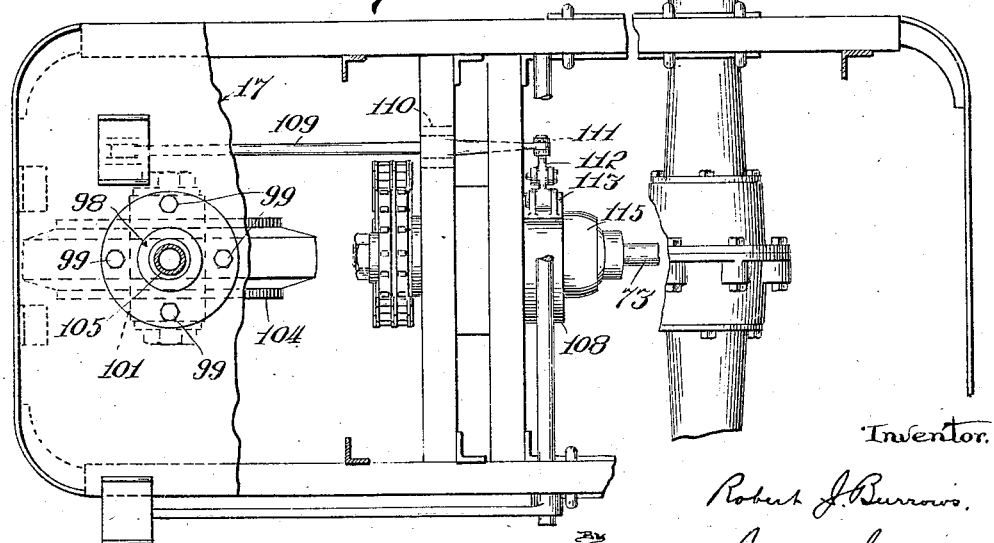

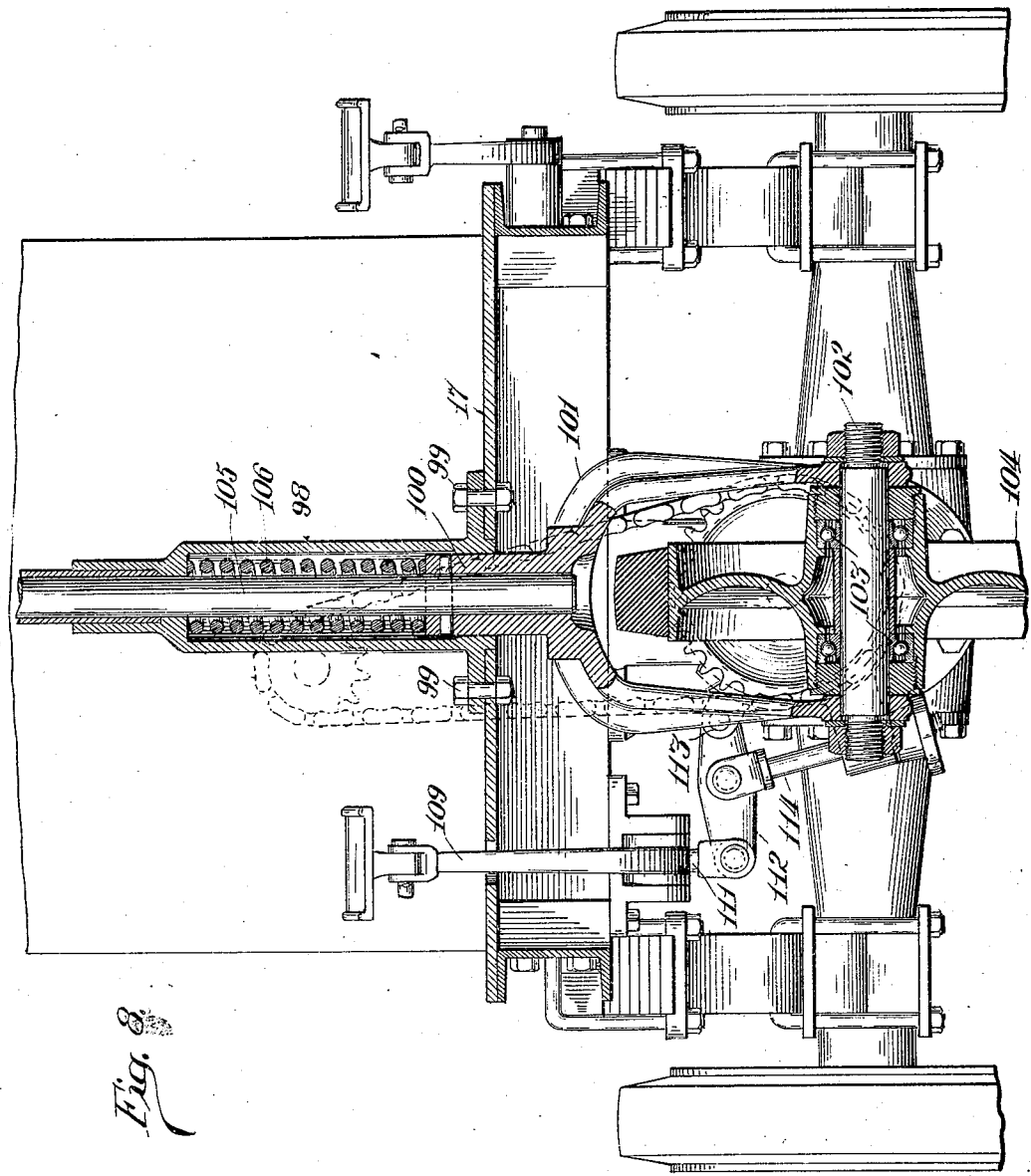

Patented June 4, 1929.

1,715,639

UNITED STATES PATENT OFFICE.

ROBERT J. BURROWS, OF BUCHANAN, MICHIGAN, ASSIGNOR TO CLARK TRUCTRACTOR COMPANY, OF BUCHANAN, MICHIGAN, A CORPORATION OF MICHIGAN.

SHOP TRACTOR.

Application filed May 7, 1923. Serial No. 637,150.

My invention relates generally to motor vehicles of the type employing an internal combustion engine as the motive power, and has particularly to do with what are known as shop tractors,—that is to say, comparatively small motor vehicles adapted to be used in shops, railway stations and other places for pulling or pushing from place to place trucks used for the transportation of articles of various sorts. Obviously tractors of this character to be successful must be small enough to operate in the aisles or other spaces between fixed machinery, and must be so constructed as to be capable of being maneuvered in narrow spaces, around sharp corners, and in other difficult situations; they must also be very flexible of control, so that they can be easily started, stopped or reversed; they must have sufficient power to handle a great variety of loads; they must be capable of operating efficiently over rough or unequal roads or runways, and they must be sturdily built so as to withstand the comparatively rough usage to which they are apt to be subjected. To provide a tractor which will meet these requirements, and which will also possess various other advantages over the tractors heretofore produced, is the object of my present invention. I accomplish this object as illustrated in the drawings and hereinafter described. What I regard as new is set forth in the claims.

In the accompanying drawings,—

Fig. 3 is principally a side elevation, some parts being in longitudinal vertical section;

Fig. 4 is a plan view of the chassis;

Fig. 5 is a partial front elevation, some parts being in section;

Fig. 6 is a side elevation, partly in section, showing a modification;

Fig. 7 is a plan view of the chassis shown in Fig. 6, some parts being broken away; and Fig. 8 is a partial vertical cross-section on line 8—8 of Fig. 6.

Figure 1:
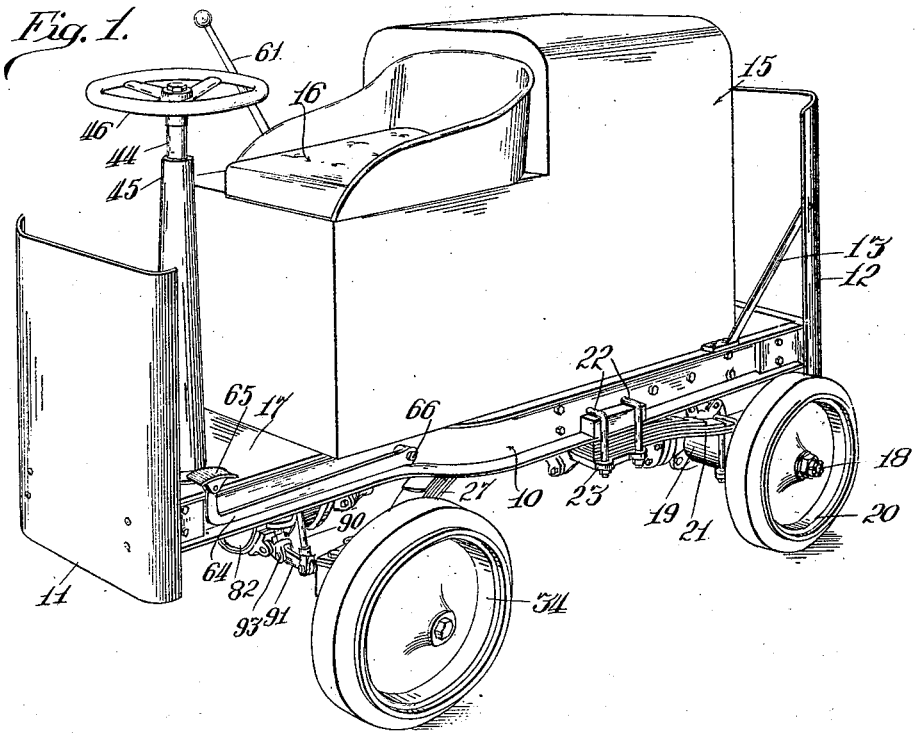
Fig. 1 is a perspective view of my improved tractor.

Referring to the drawings,—10 indicates the frame of the chassis which, as best shown in Figs. 4 and 5, is preferably composed of a channel bar bent to U-shape, the side members being bent intermediately toward each other so that the front end portion of the frame is narrower than the rear end portion thereof to provide sufficient space for the turning of the front wheels in steering. At its ends the frame 10 is provided with upright transversely disposed bumper plates 11, 12, best shown in Fig. 1, the lower ends of which extend slightly below the lower margin of the frame while their upper ends extend to a considerable height. These bumper plates are firmly braced, as by braces 13, shown in Fig. 1, so that they may be used as bumpers for pushing trucks from place to place. They also serve as dashboards to protect the operator, as well as the parts mounted on the frame. At its rear end the frame 10 is provided with a draft plate 14, shown in Fig. 4, which is fixedly secured to the frame 10 and is adapted to be used as a coupling device for coupling trucks to the tractor so that they may be hauled thereby.

Upon the frame 10 is mounted a removable hood or housing 15 which encloses the motor and other operating parts mounted on the frame and also supports the driver's seat 16, best shown in Fig. 1, which is placed in front of the motor and over the transmission gearing. In front of the driver's seat the frame 10 is provided with a platform 17 shown in Figs. 1 and 4.

At the rear the frame 10 is supported by a rear axle 18 enclosed in a housing 19 and operatively connected with rear traction wheels 20. The rear axle construction is not shown in detail, as it may be of any approved type, such as are commonly used in automobile construction, having the usual differential gearing and arranged to be driven by means of a propeller shaft. As best shown in Figs. 1 and 3, the frame 10 is mounted on the rear axle by means of two quarter-elliptic springs 21, the bases or inflexible end portions of which are fixedly secured to the side members of the frame 10 by clips 22 and plates 23, while the flexible ends of said springs extend rearwardly and are non-rotatably secured to the end portions of the rear axle housing 19 by clips 24 and plates 25, 26. As shown in Figs. 1 and 3, the front ends of the springs 21 are attached to the frame 10 about midway of the length thereof, and the rear portion of the frame overhangs the rear axle and rear wheels. Also, as shown in Fig. 3, the engine or motor and the other operating parts of the mechanism are located approximately at the longitudinal center of the tractor frame, the engine being substantially over the point of attachment of the springs 21 to said frame. By this arrangement I am able to obtain much greater tractive effort than is theoretically obtainable from the load sustained by the traction wheels, and this is particularly true in starting. This may be explained by the fact that when power is applied to the rear axle for driving the tractor in a forward direction, the reactionary effect of the torque tends to swing the springs 21 in a clockwise direction as viewed in Fig. 3, and consequently to lift the frame and its load, thereby throwing more of the load upon the rear wheels and consequently increasing their traction. In fact I have found by tests that by my improved construction I am able to obtain considerable more draw-bar pull than would normally be expected. Further advantages of mounting the springs as described are that the use of spring shackle supports and hangers is avoided and there is no necessity for providing for lubrication, as both ends of the springs are fixedly attached to the parts with which they are connected.

The front end of the frame 10 is likewise supported by quarter elliptic springs 27, the rear end portions of which are fixedly secured by clips 28 to a cross-bar 29, the ends of which are securely attached to the side members of the frame 10, as shown in Fig. 4, while the forward ends of said springs are in like manner fixedly attached by clips 30 to spring seats 31 formed on sleeves 32 carried at the ends of the front axle 33. As shown in Fig. 5, the flexible ends of the springs 27 are at the front, and, as shown in Fig. 4, said springs are arranged to converge rearwardly so that they lie between the side margins of the narrower portion of the frame 10 and therefore do not interfere with the steering of the front wheels, while at the same time the more widely separated front ends of the springs provide a broader support for the front portion of the tractor frame. As shown in Figs. 4 and 5, the front axle 33 carries the front wheels 34 which are mounted upon spindles provided with pivots 35 journaled in approximately upright bearings 36 carried by the sleeves 32, as shown in Fig. 5. The pivots 35 are carried by steering heads 37, 38, respectively, said heads being provided with rearwardly projecting arms 39 connected by a connecting rod 40 so that the heads turn in unison, and the head 38 being provided with a forwardly extending arm 41 which is connected by a connecting rod 42 with a crank 43 carried at the lower end of an upright steering shaft 44 best shown in Fig. 3. The latter shaft is journaled in a tubular housing 45 arranged in front of the driver's seat, said shaft being provided at its upper end with a steering wheel 46 by which the driver may control the steering position of the front wheels in the usual way.

Within the housing 15 is the motor 47 hereinbefore referred to, which is an internal combustion motor of any suitable type and, as has been explained, said motor is arranged back of the driver's seat and approximately at the longitudinal center of the tractor frame. Said motor is provided with the usual radiator 48 which is arranged at the rear, instead of at the front as is usually the case in automobile construction, and the usual fan 49, driven by a belt 50 from the crank shaft of the engine, is provided, as shown in Fig. 3. The usual flywheel is indicated at 51 in Fig. 3.

The rear axle 18 is driven from the motor by power taken from the usual cam shaft, instead of directly from the crank shaft as is customary, by which arrangement I eliminate one set of speed reducing gears, since in motor vehicle engine construction the cam shaft always runs at half the engine's speed. A further advantage of this arrangement is that it admits of running the engine normally at high speed, thereby giving smoother running under loads and making it practical to obtain from a two cylinder engine the same relative torque as would ordinarily be obtained by the use of a four cylinder engine, although of course the same horse power would not be obtained. This arrangement is especially important for starting and because of the greater flexibility resulting from the fact that the speed of the crank shaft can be kept up. It has not been thought necessary to illustrate in detail the relative arrangement of the crank and cam shafts, as that is well understood by those familiar with the art, and it will suffice to say that the cam shaft is geared in the usual way to the crank shaft, as indicated in dotted lines on Fig. 5, in which 52 indicates the crank shaft, 53 a gear carried thereby, and 54 a gear mounted on the cam shaft, the latter gear being twice the diameter of the gear 53 so that the cam shaft rotates at half the speed of the crank shaft. The front end portion of the cam shaft, which is indicated by the reference numeral 55, is illustrated in Fig. 3, and such front end portion carries one member of a clutch 56, the other member of which is secured upon the rear end of a longitudinally disposed shaft 57 arranged in alinement with the cam shaft 55. The shaft 57 is arranged to be connected, through the usual transmission gearing by which two or more speeds forward, including a direct drive on high speed and one speed in reverse, may be obtained, with a shaft 58 alined therewith and mounted in and extending through the forward portion of a housing 59 which encloses the clutch and transmission gearing in the usual way. This shaft 58 carries a sprocket wheel 60, shown in Figs. 3 and 5, from which power is transmitted to the rear axle, as will be hereinafter described. The transmission gearing is operated in the usual way by a lever 61 and any suitable gear shift mechanism, such as the H type commonly used in automobile construction. Obviously, when the members of the clutch 56 are in operative engagement with each other, the cam shaft 55 will drive the shaft 57, and consequently the shaft 58 will be rotated, its speed and direction being determined by the connections of the transmission gearing and the speed of the crank shaft. For controlling the engagement of the members of the clutch 56, I provide any suitable mechanism, such as a rock shaft 62 mounted in the housing 59, as shown in Fig. 3, and provided with a crank 63 by which it may be rocked to disengage the clutch members, they being normally held in engagement with each other by a spring in the usual way. The crank 63 is actuated by means of a foot lever 64 shown in Fig. 1, which has a pedal 65 conveniently accessible to the driver, said clutch lever being mounted on a rock shaft 66 journaled in the side members of the frame 10 and provided with an upright arm 67, shown in Figs. 3 and 5, which is connected to the crank 63 by a connecting rod 68 shown in Fig. 3. The arrangement is such that by depressing the pedal 65 the clutch members will be disengaged, as is usual in automobile construction.

Figure 2:
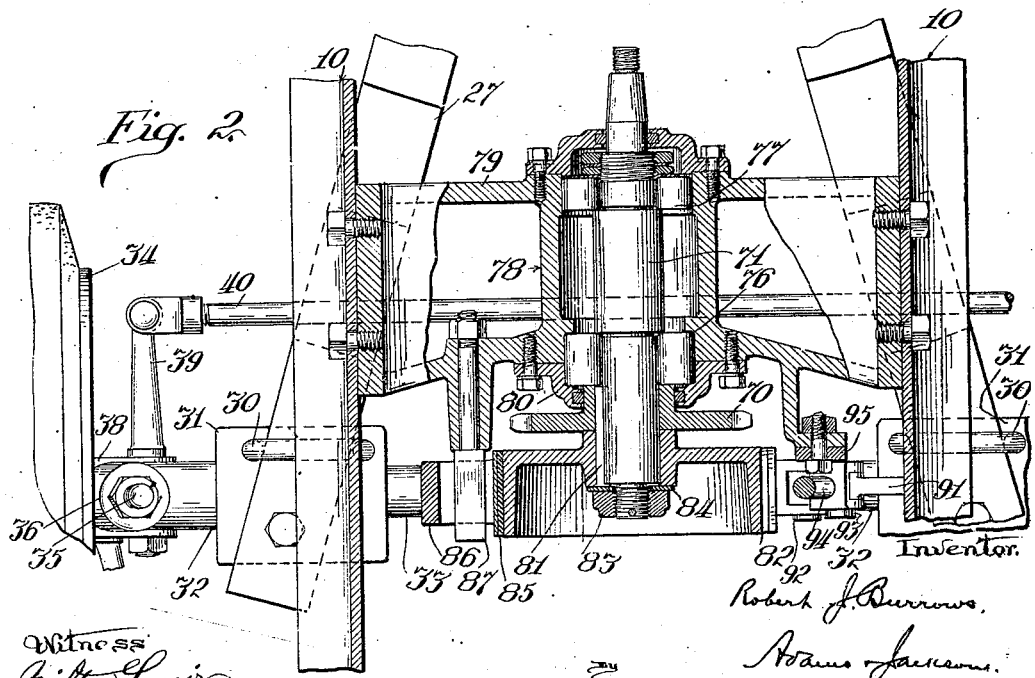
Fig. 2 is a horizontal section on line 2—2 of Fig. 5, illustrating more particularly the mounting of the driving element of the propeller shaft.

Power is transmitted from the sprocket wheel 60 to the rear axle 18 by means of a link belt 69 which runs over said sprocket wheel and over a sprocket wheel 70 mounted upon and keyed to the driving member 71 of a jointed propeller shaft, the other members of which are a stub shaft 72 which is connected with the differential gearing of the rear axle in the ordinary way, and an intermediate member 73 which is connected to the members 71 and 72, respectively, by universal or flexible couplings 74, 75 of any suitable description, although I prefer to employ connections of the flexible disc type, as shown in Fig. 3. The propeller shaft member 71 is arranged so that it extends fore and aft under the clutch housing 59 at the front end of the tractor and is mounted in anti-friction bearings 76, 77 contained in a housing 78 which is supported by a cross-beam 79 secured to the side members of the frame 10, as shown in Fig. 2. Preferably the housing 78 is made integral with the beam 79 and is provided with removable end plates 80, so that access may be conveniently had to the interior thereof. The sprocket wheel 70 is mounted on the forward end of the shaft 71 and is keyed thereto by a key or spline 81 which also serves to key upon said shaft a brake drum 82, shown in Fig. 2, from which it will be seen that said brake drum is mounted upon the front end of the member 71 and is held in place by a nut 83 and a washer 84. Thus the brake drum is readily accessible from the front of the tractor and the brake may be conveniently adjusted. The arrangement of the brake is best shown in Figs. 2 and 5, 85 indicating an external brake band which extends around the brake drum 82 and is supported intermediately by a bracket 86 adjustably mounted on an arm 87 supported by the beam 79, as best shown in Fig. 2. The separated ends of the brake band 85 are arranged to be drawn together or forced apart in the usual way, as by means of a foot lever 88 loosely mounted on the rock shaft 66 and provided with a pedal 89, as shown in Figs. 3 and 4. The lever 88 is connected by a connecting rod 90 with the outer end of a lever 91, the inner end of which is pivotally connected by a pivot 92 with one end of the brake band 85. The lever 91 is also connected intermediately thereof by a pivot 93 with a connecting rod 94 which extends upwardly through a guide bracket 95 and is adjustably connected at its upper end by a nut 96 and a sleeve 97 with the opposite end of the brake band 85. Thus by depressing the pedal 89 the rod 90 will be thrust downward, thereby depressing the outer end of the lever 91 and consequently drawing together the separated ends of the brake band so that the brake band is caused to grip the brake drum 82. A spring, not shown, is of course provided to normally hold the brake band in its inoperative position.

From the foregoing description it will be understood that when the clutch members are in engagement with each other and the shaft 58 is connected therewith, either directly or through the transmission gearing, the shaft member 71 will be rotated in one direction or the other, thereby driving the rear axle and propelling the tractor. The tractor will be driven at half the speed at which it would be driven if power were taken directly from the crank shaft instead of from the cam shaft, with the resulting advantages hereinbefore pointed out. By arranging the forward portion of the propeller shaft under the clutch housing or transmission gear case, which in the present instance are combined, I am able to make the wheel base much shorter, so that the tractor can be maneuvered very readily in confined spaces and therefore is peculiarly suitable for use in shops and factories where fixed machine tools and piles of raw material leave little room for its passage.

In Figs. 6, 7 and 8 I have shown a modified arrangement by which I provide a three-wheeled tractor instead of a four-wheeled one as shown in the other figures. In such modified construction the front end of the tractor is provided centrally with an upright cylindrical head 98 which is firmly secured, preferably by bolts 99, to the platform 17. Into the bore of the head 98 extends the tubular stem 100 of a yoke 101, between the arms of which is mounted a shaft 102, as shown in Fig. 8. This shaft carries anti-friction bearings 103 on which is mounted a ground wheel 104. It is apparent that by turning the stem 100 about a vertical axis the wheel 104 may be turned to steer the tractor, and for the purpose of rotating the stem 100 it is connected to a steering rod 105 which rises through the head 98 and is provided at its upper end with the usual steering wheel. Around the steering rod 105 within the head 98 is a spring 106 arranged to exert downward pressure on the upper end of the stem 100, thereby yieldingly supporting the front portion of the tractor upon the front wheel. In this modified arrangement, because of the central location of the front wheel, it is desirable to mount the brake drum upon the rear end of the propeller shaft member 71 instead of the front end thereof as in the earlier views. This modified arrangement is best shown in Figs. 6 and 7, in which 107 indicates the brake drum and 108 the brake band. In this arrangement I employ a brake lever 109 pivotally fulcrumed between brackets 110 secured to the frame of the tractor, said lever being connected by a connecting rod 111 with a lever 112, one end of which is connected by a pivot 113 with one end of the brake band, while it is connected intermediately by a connecting rod 114 with the opposite end of said brake band, as shown in Fig. 8. In Fig. 6 I have also shown the members of the propeller shaft connected together by universal connections 115, 116 of the ball and socket type, as connections of that type are preferable where the brake drum is located at the rear end of the front member of the propeller shaft, although either form may be used in either case.

Having thus described the embodiment of my invention illustrated in the accompanying drawings, I wish it to be understood that it is not restricted to the specific features of construction illustrated and described, except in so far as they are particularly claimed, but includes generically the subject matter pointed out in the broader claims, and such modifications or variations thereof as would occur to those skilled in the art.

What I claim as my invention and desire to secure by Letters Patent, is—

1. A motor vehicle comprising a frame, front and rear wheels supporting said frame, a motor mounted on said frame, a propeller shaft extending forward under the motor and operatively connected with the rear wheels, change speed transmission gearing forward of the motor, means for connecting said transmission gearing at the rear with the motor, and sprocket wheel and chain mechanism operatively connecting said propeller shaft with said transmission gearing at the front thereof.

2. A tractor comprising a spring supported frame, steering means at the front of said frame, propelling wheels at the rear thereof, a motor mounted intermediately on said frame, change speed transmission mechanism driven by said motor and extending forward therefrom, a driver's seat over said transmission mechanism, and means flexibly connected with the forward end of said transmission mechanism and operatively connected with the rear wheels for driving the same.

3. A tractor comprising a spring supported frame, steering means at the front of said frame, propelling wheels at the rear thereof, a motor mounted intermediately on said frame, change speed transmission mechanism driven by said motor and extending forward therefrom, a driver's seat over said transmission mechanism, and a drive shaft extending under said motor and flexibly connected with the forward end of said transmission mechanism to be driven thereby, the rear end of said shaft being operatively connected with the rear wheels for driving the same.

4. A tractor comprising a spring supported frame, steering means at the front of said frame, propelling wheels at the rear thereof, a motor mounted intermediately on said frame, change speed transmission mechanism disposed in front of said motor, clutch mechanism at the side of the motor away from the propelling wheels operable to connect said transmission mechanism with said motor, a shaft operatively connected with the rear wheels for driving the same, said shaft extending forward under said motor, and means flexibly connecting the forward end of said shaft with said transmission mechanism.

5. A motor vehicle comprising a frame, front and rear wheels, springs supporting said frame on said wheels, a flexible propeller shaft having its rear end portion connected with the rear wheels, bearings carried by the frame for the front end portion of said propeller shaft, a motor mounted on the frame back of said bearings, change speed transmission mechanism mounted on the frame adjacent to the front end portion of the propeller shaft, clutch mechanism forward of the motor operable to connect said transmission mechanism with said motor, and sprocket wheel and chain mechanism connecting said transmission mechanism at the front hereof with the front end portion of said propeller shaft.

6. A motor vehicle comprising a frame, front and rear wheels supporting said frame, a motor mounted on said frame, a jointed propeller shaft extending forward of the motor and having a forward end portion journaled on the frame, a sprocket wheel mounted on said forward end portion, the rear end portion of said propeller shaft being operatively connected with the rear wheels, a sprocket wheel mounted at the forward portion of said frame, a chain operatively connecting said sprocket wheels, and means comprising change speed gearing and clutch mechanism forward of the motor for driving said sprocket wheels from said motor.

7. A motor vehicle comprising a frame, front and rear wheels, springs supporting said frame on said wheels, a motor mounted on said frame, a propeller shaft extending forward of the motor and having a forward end portion journaled on the frame, the rear end portion of said shaft being operatively connected with the rear wheels, means extending forward from said motor and flexibly connected with the propeller shaft for driving the same from said motor, and a brake drum mounted on said forward end portion of said propeller shaft.

8. A motor vehicle comprising a frame, front and rear wheels supporting said frame, a motor mounted on said frame, a propeller shaft extending forward of the motor and operatively connected with the rear wheels, change speed gearing extending forward from said motor and connected with the propeller shaft for driving the same from said motor, and a brake drum mounted on the front end portion of said propeller shaft.

9. A motor vehicle comprising a frame, front and rear wheels supporting said frame, an internal combustion motor mounted on said frame, said motor having a crank shaft and a cam shaft driven by said crank shaft, a propeller shaft operatively connected with the rear wheels, and means for driving said propeller shaft from said cam shaft.

10. A motor vehicle comprising a frame, front and rear wheels supporting said frame, an internal combustion motor mounted on said frame, said motor having a crank shaft and a cam shaft driven by said crank shaft, a propeller shaft operatively connected with the rear wheels, a clutch member carried by the cam shaft, a cooperating clutch member, and means for connecting the latter clutch member with said propeller shaft.

11. A motor vehicle comprising a frame, front and rear wheels supporting said frame, an internal combustion motor mounted on said frame, said motor having a crank shaft and a cam shaft driven thereby, a propeller shaft operatively connected with the rear wheels, and transmission gearing for connecting said cam shaft with said propeller shaft.

12. A motor vehicle comprising a frame, front and rear wheels supporting said frame, an internal combustion motor mounted on said frame, said motor having a crank shaft, a propeller shaft operatively connected with the rear wheels, clutch mechanism for connecting said propeller shaft with said motor, and means for driving said clutch mechanism from said crank shaft at reduced speed.

13. A motor vehicle comprising a frame, front and rear wheels supporting said frame, an internal combustion motor mounted on said frame, said motor having a crank shaft and a cam shaft driven at reduced speed from said crank shaft, a propeller shaft operatively connected with the rear wheels, and clutch mechanism driven by said cam shaft for connecting said propeller shaft with said motor.

14. A motor vehicle comprising a frame, front and rear wheels supporting said frame, an internal combustion motor mounted on said frame, said motor having a crank shaft and a cam shaft driven at reduced speed from said crank shaft, a propeller shaft operatively connected with the rear wheels, clutch mechanism driven by said cam shaft, and transmission mechanism interposed between said clutch mechanism and said propeller shaft.

ROBERT J. BURROWS.